US009033278B2

(12) United States Patent
Van Loon et al.

(10) Patent No.: US 9,033,278 B2
(45) Date of Patent: May 19, 2015

(54) DEVICE FOR ACCOMMODATING OBJECTS, TROLLEY, METHOD FOR MANUFACTURING A TROLLEY, AS WELL AS TRANSPORT MEANS

(75) Inventors: Laurentius Petrus Joseph Van Loon, Slootdorp (NL); Cornelis Petrus Maria Portegies, Nieuwe Niedorp (NL); Peter Hendrik Beets, Middenbeemster (NL)

(73) Assignee: DRIESSEN AEROSPACE GROUP N.V., Wieringerwerf (NL)

( * ) Notice: Subject to any disclaimer, the term of this patent is extended or adjusted under 35 U.S.C. 154(b) by 1738 days.

(21) Appl. No.: 11/817,603

(22) PCT Filed: Mar. 6, 2006

(86) PCT No.: PCT/NL2006/050048
§ 371 (c)(1), (2), (4) Date: Oct. 16, 2007

(87) PCT Pub. No.: WO2006/093412
PCT Pub. Date: Sep. 8, 2006

(65) Prior Publication Data
US 2008/0116773 A1    May 22, 2008

(30) Foreign Application Priority Data
Mar. 4, 2005  (NL) ..................................... 1028462

(51) Int. Cl.
| B62B 3/10 | (2006.01) |
| B64D 11/04 | (2006.01) |
| A47B 31/00 | (2006.01) |
| B62B 5/00 | (2006.01) |

(52) U.S. Cl.
CPC ................. *A47B 31/00* (2013.01); *B64D 11/04* (2013.01); *A47B 2031/002* (2013.01); *B62B 5/0006* (2013.01); *B62B 2202/67* (2013.01)

(58) Field of Classification Search
CPC ........... B62B 11/00; B62B 3/10; B64D 11/04
USPC ............ 280/47.34, 79.11, 79.3, 33.998, 79.2, 280/47.36; 244/118.5
See application file for complete search history.

(56) References Cited

U.S. PATENT DOCUMENTS 3,906,744 A * 9/1975 Knapp et al. ..................... 62/384
3,997,028 A * 12/1976 Lopez ............................. 186/44
(Continued)

FOREIGN PATENT DOCUMENTS

| DE | 102005056079 | 6/2006 |
| DE | 102005056079 A1 | 6/2006 |

(Continued)

OTHER PUBLICATIONS

International Search Report, dated Oct. 24, 2006, application No. PCT/NL2006/050048.

*Primary Examiner* — Tien Dinh
*Assistant Examiner* — Michael Wang
(74) *Attorney, Agent, or Firm* — Young & Thompson

(57) ABSTRACT

A device for accommodating objects, in particular for use in an airplane, comprises at least one panel. The panel has at least one outer edge which is provided with a rim in order to form a shock-absorbing edge. The rim comprises plastic that is integrally molded onto the outer edge of the panel. The device can be an airplane trolley, folding trolley, container or galley.

16 Claims, 11 Drawing Sheets

(56) References Cited

U.S. PATENT DOCUMENTS

Figure 1:
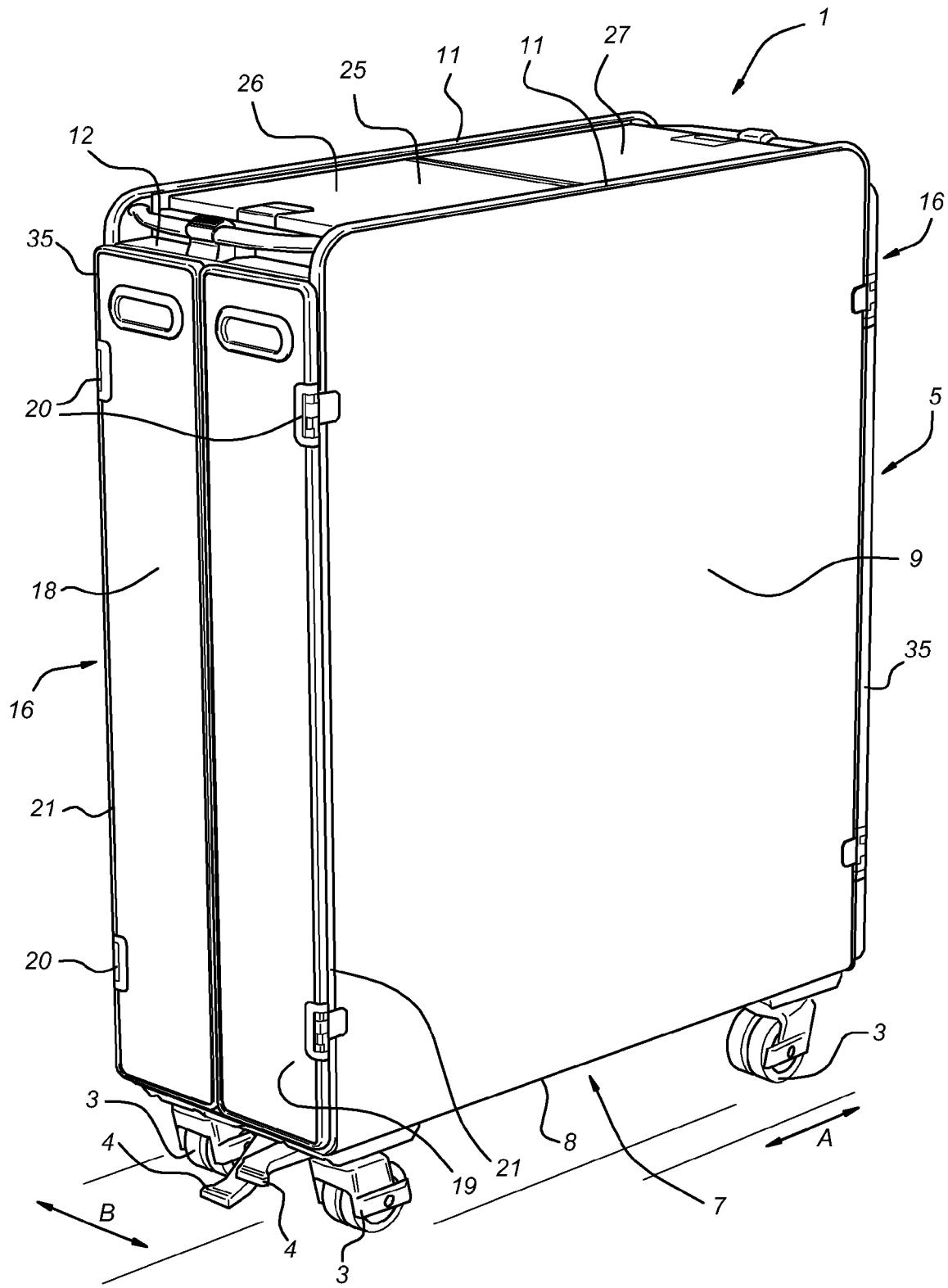

| | | | |
|---|---|---|---|
| 4,093,041 A * | 6/1978 | Davis et al. | 186/45 |
| 4,285,391 A * | 8/1981 | Bourner | 165/61 |
| 4,936,377 A | 6/1990 | DeVogel et al. | |
| 5,159,973 A * | 11/1992 | Pennington et al. | 165/48.1 |
| 6,034,355 A * | 3/2000 | Naderi et al. | 219/387 |
| 6,234,498 B1 * | 5/2001 | Saku et al. | 280/47.34 |
| 6,460,952 B1 * | 10/2002 | Tryon | 312/265.5 |
| 7,444,830 B2 * | 11/2008 | Moran et al. | 62/371 |
| 7,544,915 B2 * | 6/2009 | Hu | 219/387 |
| 2006/0070814 A1 * | 4/2006 | Hu | 186/45 |
| 2008/0220139 A1 * | 9/2008 | Palmer | 426/524 |

FOREIGN PATENT DOCUMENTS

| | | |
|---|---|---|
| EP | 0922414 | 6/1999 |
| EP | 0922415 B1 | 4/2003 |
| FR | 2561509 | 9/1985 |
| FR | 2561509 A1 | 9/1985 |
| GB | 959185 | 5/1964 |

\* cited by examiner

DEVICE FOR ACCOMMODATING OBJECTS, TROLLEY, METHOD FOR MANUFACTURING A TROLLEY, AS WELL AS TRANSPORT MEANS

The invention relates to a device for accommodating objects, in particular for use in an airplane, comprising at least one panel. In particular, the invention relates to a trolley, comprising a housing provided with a bottom wall, two upright side walls, each of which extends from the bottom wall, and a top wall, which is arranged substantially parallel to the bottom wall and transversely between the side walls.

According to the invention, this device may be a trolley which can be moved along an aisle, for example in an airplane. In the airline industry, such a trolley is also referred to as a catering trolley. A trolley is used by cabin staff to take meals or duty-free articles to the seats of passengers in an airplane. The invention relates in particular to trolleys of this type. In this description, the term trolley may be used to refer to a trolley for use in airplanes, as well as any other kind of trolley, such as a service trolley or catering trolley intended for use on trains, ships or in hospitals.

A service trolley has a particular shape. Usually, a service trolley is narrow, i.e. the height to width ratio of the service trolley is quite large, for example a factor of 2 or more. Furthermore, a service trolley is usually elongate—in which case the bottom wall is rectangular, while the side walls are connected to the long sides of the bottom wall. The side walls are located on a longitudinal side of the housing.

The device according to the invention may, however, also be a so-called galley, i.e. a kitchen on board an airplane. A galley has storage cupboards which can each be closed off by a door. Usually, in a galley in an airline cabin space is also provided for accommodating a container having a door. The device according to the invention may also be a container of this type. In addition, it is possible according to the invention for the device to form a folding trolley. A folding trolley has a folding frame, for example made from stainless steel, to which a panel is attached. In the folded-out position, the panel can support objects.

It is an object of the invention to provide a device having a panel, which can withstand impacts well and has a relatively low weight.

This object is achieved according to the invention in that the panel has at least one outer edge which is provided with a rim in order to form a shock-absorbing edge, and in that the rim comprises plastic. The plastic comprises, for example, polyurethane. A plastic shock-absorbing edge improves the collision-resistance of the device with the panel, while plastic is relatively light.

Preferably, the plastic rim is integrally molded onto said outer edge of said panel. Integrally molding on of the plastic to the panel results in a particularly strong bond between the plastic shock-absorbing edge and the panel.

In particular, the integral molding on of a plastic shock-absorbing edge has proved to be advantageous if the panel is provided with a core, which is covered on either side with an inner layer and an outer layer, respectively. The inner layer and the outer layer may in this case each comprise aluminum, while the core of the panel is provided, for example, with a honeycomb structure, which preferably comprises aluminum.

A trolley is known from FR 2.561.509. The walls of the housing and the door are each formed by a panel with a core having a honeycomb structure, to either side of which the inner layer and outer layer are glued, respectively. The inner and outer layers are formed by resin-impregnated carbon fibers. Two upright panels are glued onto the bottom wall at right angles thereto, which upright panels form part of the side walls. The top wall is glued onto the top edges of these upright panels at right angles thereto. In order to form a cooling tray, two short upright panels are glued onto the top wall which also form part of the side walls. A lid wall is glued between these upright panels. In order to reinforce the connections between the panels, internal and external thin-walled angle sections are glued to perpendicular connections. The angle sections are for example made from resin-impregnated carbon fibers.

By using panels with a honeycomb structure, this trolley is relatively lightweight. This is favorable, since any increase in the total weight of the airplane leads to a significant increase in fuel consumption. The aim of the airlines which operate the airplanes is to achieve a trolley with a weight which is as low as possible.

However, this trolley is susceptible to damage. A catering company fills the trolley with serving trays at the airport, following which the trolley has to be transported to the galley inside an airplane cabin. In practice, collisions will occur while the trolley is being moved and otherwise maneuvered—the trolley may, for example, hit a door post. The panels with the core having a honeycomb structure, in particular the external edges of the trolley, quickly become damaged as a result.

The external angle sections, which are glued onto the corners of the known trolley, act as reinforcing profiles. These thin-walled angle sections made from carbon fibers are not suitable for absorbing an impact load in order to prevent the panels from being damaged. Moreover, these external angle profiles may become detached as a result of the impacts. This results in reduced strength and rigidity of the trolley, giving rise to regular maintenance.

It is another object of the invention to provide a trolley which is not as easily damaged by a collision, while keeping the weight of the trolley relatively low.

This object is achieved according to the invention in that at least one wall of the trolley has at least one outer edge which is provided with a rim in order to form a shock-absorbing edge, and in that the rim comprises plastic. The plastic is, for example, polyurethane (PU). When this shock-absorbing edge collides with an object, the impact load is absorbed by the plastic rim designed as a shock-absorbing edge without resulting in damage to the trolley. There is therefore less chance of damage to the trolley as a result of a collision. In addition, the mass of the plastic rim is low, resulting in the weight of the trolley remaining relatively low.

It should be noted that shock-absorbing edges for trolleys are known per se. A well-known airplane trolley has a housing, which is formed by aluminum walls. Aluminum rims are fitted along the edges of the walls. The peripheral edge of a door is also provided with an aluminum rim of this type. Although the aluminum rims offer sufficient protection of the trolley against collisions, such aluminum rims are relatively heavy. Taken together, the aluminum rims of the generally known trolley even constitute a significant part of the total weight of the trolley.

The plastic rim may be attached in different ways, for example by gluing. According to the invention, it is preferable that the plastic rim is integrally molded onto said outer edge of said wall. As a result of the plastic rim being integrally molded on, the plastic penetrates a certain distance into the core from the end surface of the respective edge, for example penetrates into a honeycomb structure or foam. This ensures an excellent attachment of the rim. As a result of the combination of a slightly permeable core and molded plastic, the shock-absorbing edge will not become detached.

According to the invention, it is preferable that each of the side walls of the housing has upright edges and top edges, the plastic rim, optionally molded on, for forming shock-absorbing edges being attached to these upright edges and top edges. The upright edges and the top edges of the side walls are then protected against collisions.

In order to protect the trolley according to the invention further, the molded-on plastic rim for forming shock-absorbing edges may be attached on the end edges of the bottom wall.

In one embodiment of the invention, the bottom wall and the side walls are integrally formed as a U-shaped panel, which is formed from a flat rectangular blank, which has two weakened lines along which the blank can be folded, the bottom wall being formed between the weakened lines, and in each case one side wall being formed on the sides of the weakened lines facing away remote from the bottom wall, and the peripheral edge of the flat blank being provided with the plastic rim. In contrast to the panels of the known trolley which are glued together, the bottom wall and the side walls of the trolley according to this embodiment form one single component. The connection between the bottom wall and the side walls of the trolley is thus very reliable.

Furthermore, by integrating the bottom wall and the side walls, the plastic rims along the edges thereof can be attached in a single process step. To this end, the flat blank for the U-shaped panel is placed in a mold, following which plastic is injected, so that the entire peripheral edge of the blank is framed by the plastic rim.

According to the invention, it is possible that each of the walls of the housing is provided with a core, which is covered on either side with an inner layer and an outer layer, respectively. In this case, the weakened lines may each be formed by a cutout in the inner layer of the blank. The cutout forms a reliable folding line along which the blank can be folded in a controlled manner.

In one embodiment of the invention, the cutouts of the U-shaped panel, which form the weakened lines, extend along the bottom edges of the housing, a plastic being poured into the cutout in order to reinforce the bottom edges. The bottom edges are the edges of the housing where the bottom wall is connected to in each case one side wall. The generally known trolley has aluminum rims along these bottom edges of the housing in order to absorb shocks. However, according to this embodiment, rims along the bottom edges are superfluous, as the bottom edges are internally reinforced by plastic, which is injected or poured in via the cutouts in the folded U-shaped panel. The cutouts each form a pouring slot for the plastic, thus further reducing the weight of the trolley.

The plastic introduced in the cutout may in addition seal the cutout, so that the interior of the housing is substantially watertight. The intrusion of moisture or water via the cutouts might affect the strength of the core.

In this case, it is preferable that the plastic has a viscosity such that the plastic has flowed from the cutout, through the honeycomb structure, up to the outer layer of the panel. The viscosity of the plastic, for example, enables the plastic to descend through the core up to the outer layer of the panel by the effect of the force of gravity. The plastic is preferably the same plastic as that used for the rims, so that the reinforcement of the bottom edge can take place at the same time as the provision of the rims.

In one embodiment of the invention, a series of spaces is arranged on the inside of each side wall, which series of spaces runs parallel to and at a distance from the top edge of this side wall, and the top wall is provided on its longitudinal edges with a series of lips, the lips on the top wall being received in these spaces in the side walls. Such a connection of the top wall to the side walls of the housing is very strong. It is possible to reinforce the connection by gluing.

In one embodiment of the invention, an upright partition is fitted transversely between the side walls, the partition being provided with lips at least along its longitudinal edges, and an upright series of spaces being provided on the inside of each side wall, which series of spaces in each case extends from the bottom wall to the top wall, the lips of the partition being received in these spaces in the side walls. The partition divides the housing into two sub-chambers. Similarly to the connection between the top wall and the side walls, the connection by means of lips and spaces results in a reliable and strong connection. If desired, glue is applied between the partition and the side walls.

The partition may be constructed in the same manner as the walls of the housing, i.e. the partition may comprise a core, which is covered on either side with an inner layer and an outer layer, respectively.

According to the invention, it is possible that the housing has at least one access opening, which is delimited by the walls, and the trolley comprising at least one door, which is connected to an upright side wall so as to be pivotable between an open position, in which the access opening is accessible, and a closed position, in which the access opening is at least partially closed off, and the door being provided with a core, which is covered on either side with an inner layer and an outer layer, respectively, the door comprising a plastic rim on its peripheral edge which is optionally molded onto this peripheral edge. This results in a lightweight door being formed, the plastic rims of the door providing lightweight shock-absorbing edges which are attached to the peripheral edge of the door in a wear-resistant manner.

It is possible according to the invention that the door comprises two door panels, each door panel being provided with a core, which core is covered on either side with an inner layer and an outer layer, respectively, the peripheral edge of each door panel comprising a plastic rim which is optionally integrally molded onto this peripheral edge. In this case, the door of the trolley is a split door comprising two door panels.

Due to the sandwich construction, each door panel is relatively lightweight, while the plastic rims protect each door panel along the periphery thereof against impact.

According to the invention, each door panel may be provided with a plastic handle, which is molded at the same time as the plastic rim. The handle makes it possible to influence the position of the door panels. As the handle is molded at the same time as the plastic rim, the rim and the handle can be produced in a single process step in a mold.

In one embodiment of the invention, the door panels are provided with guides for supporting a serving tray on the inside facing the interior of the housing, which guides are each provided with a series of pins inserted in holes in the door panel. The pins form a lightweight guide.

Similarly, each inside of the side walls facing the interior of the housing may be provided with guides for supporting serving trays, which guides are each provided with a series of pins inserted in holes in the door panel. The known trolley has guides which are formed by rails. The rails are relatively heavy. The pin guide according to the invention is simple and lightweight.

In one preferred embodiment of the invention, the core of the respective panels comprises a honeycomb structure and/or a foam. Preferably, the inner layer and/or outer layer of the core comprise aluminum and/or glass fibers which are impregnated with resin. Aluminium in particular is suitable for airplane trolleys.

The invention also relates to a trolley, comprising a housing which is provided with a bottom wall, two upright side walls, each of which extends from the bottom wall, and a top wall, which is arranged substantially parallel to the bottom wall and transversely between the side walls. According to the invention, the bottom wall and the side walls are integrally formed as a U-shaped panel, which is formed from a flat, rectangular blank.

Preferably, in this case, the blank has two weakened lines, along which the blank can be folded, the bottom wall being formed between the weakened lines, and in each case one side wall is formed on the sides of the weakened lines facing away from the bottom wall.

The invention also relates to a method for forming a trolley, comprising providing a rectangular blank provided with a honeycomb structure, which is covered on either side with an inner layer and an outer layer, respectively, providing two weakened lines by removing a respective cutout from the inner layer, placing the blank in a mold, integrally molding on a plastic rim along the peripheral edge of the blank in order to form a shock-absorbing edge for the blank, folding the blank along the weakened lines to form a U-shaped panel, which forms the bottom wall and the side walls. With this method according to the invention, the bottom wall and the side walls of the housing, as well as the plastic rims along the edges thereof are formed in one single process step. As a result, the production of the housing is inexpensive.

Preferably, during the folding of the blank, the top wall, and optionally the partition, are accommodated between the side walls by the spaces in the side walls receiving the lips of the top wall, and optionally the lips of the partition.

The invention also relates to a transport means for transporting a plurality of passengers, comprising at least two rows of seats separated by an aisle. According to the invention, a trolley as described above is provided in the aisle. The transport means is, for example, an airplane, a train or a vessel.

Figure 3:
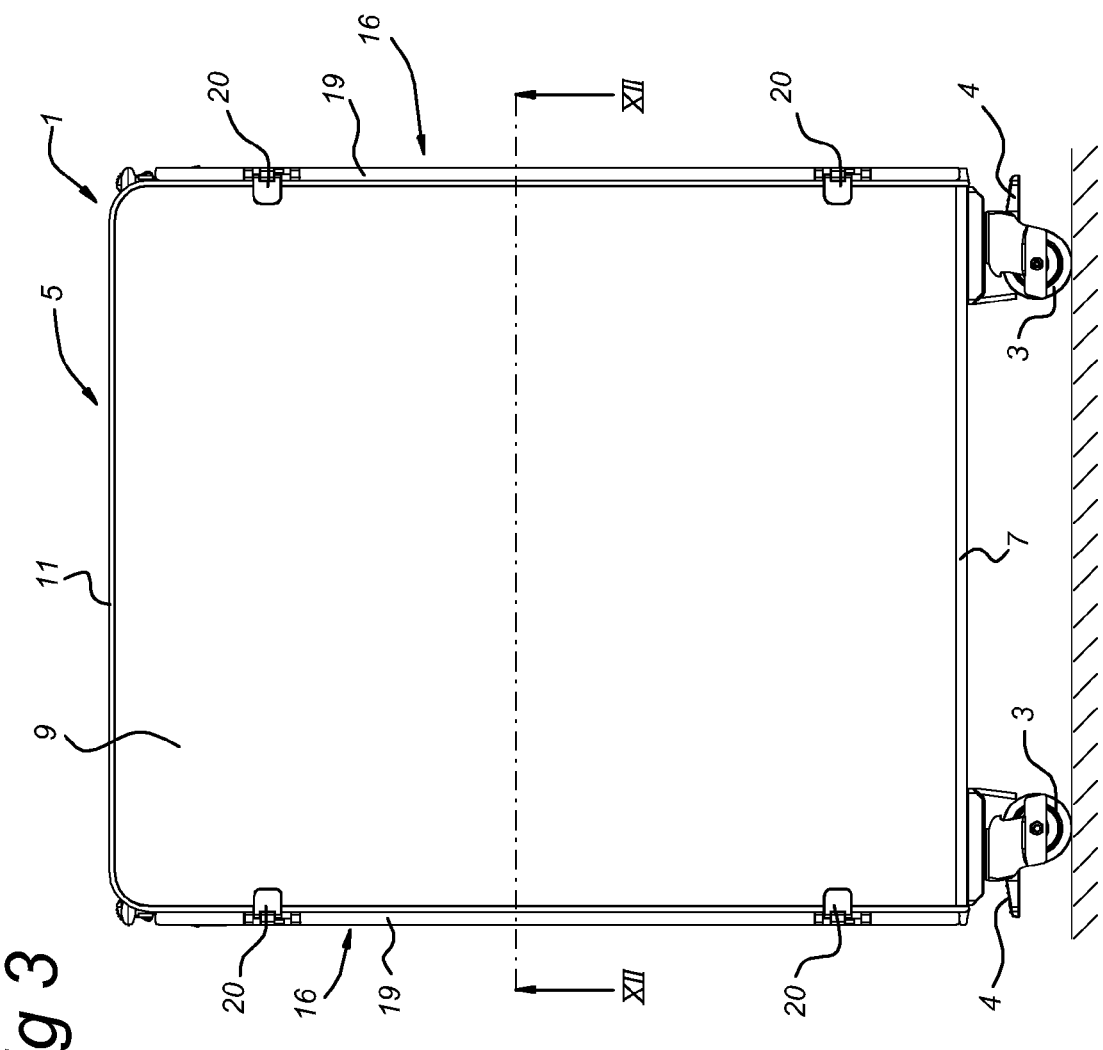
Figure 2:
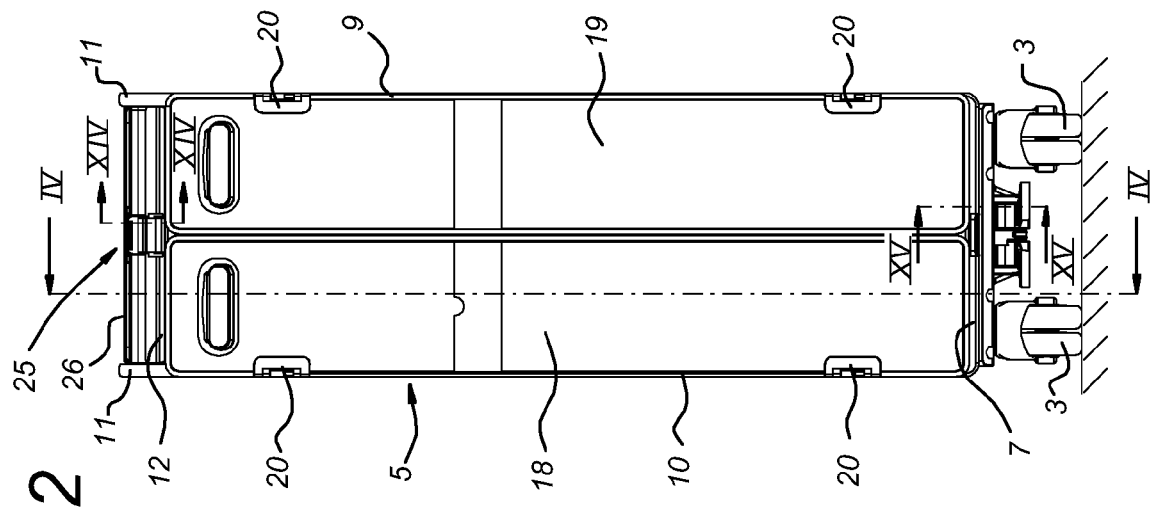
Figure 4:
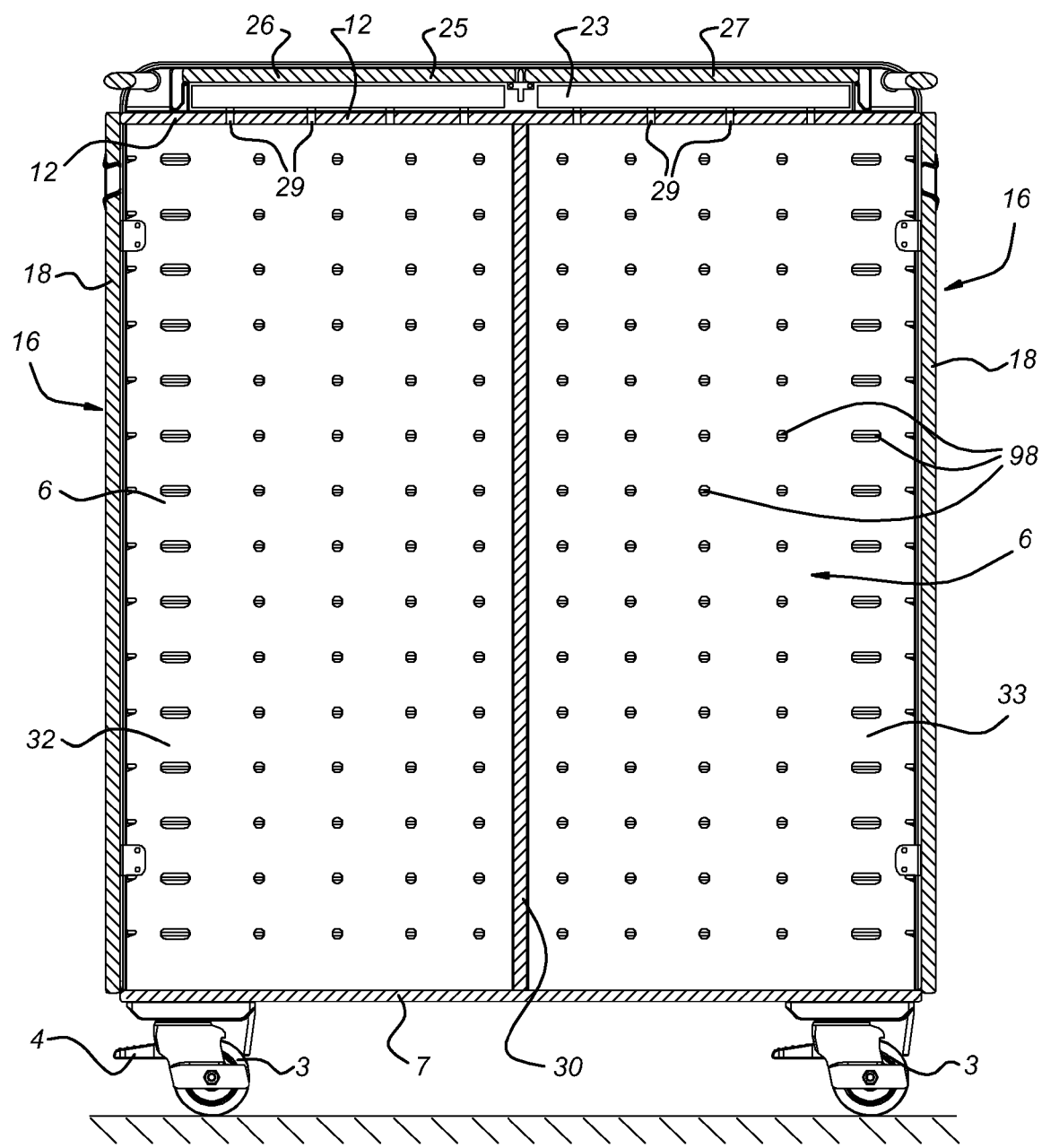
Figure 5:
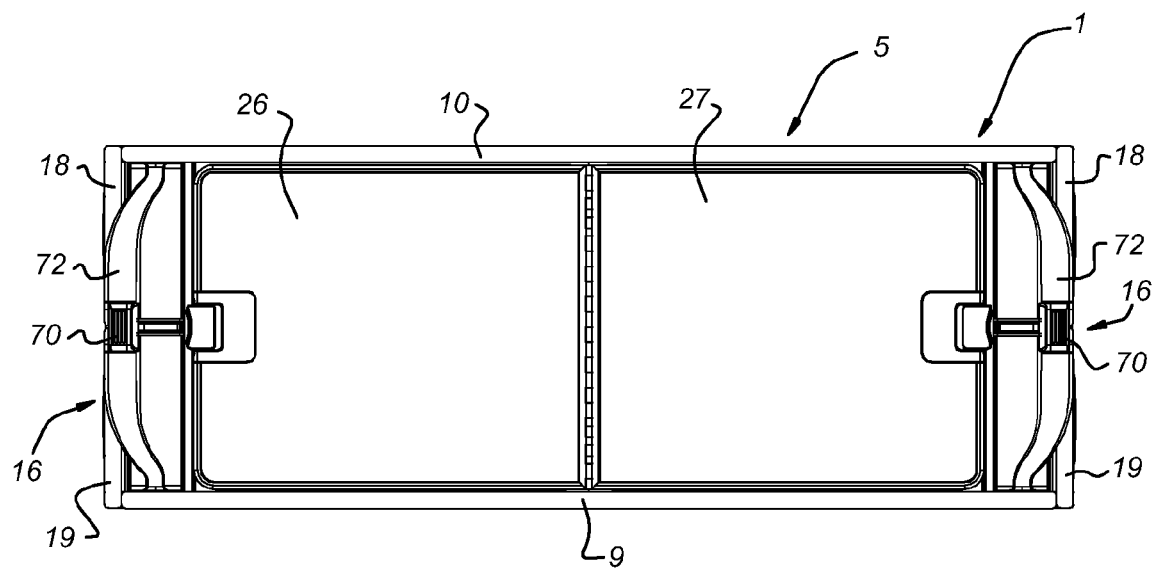
Figure 6:
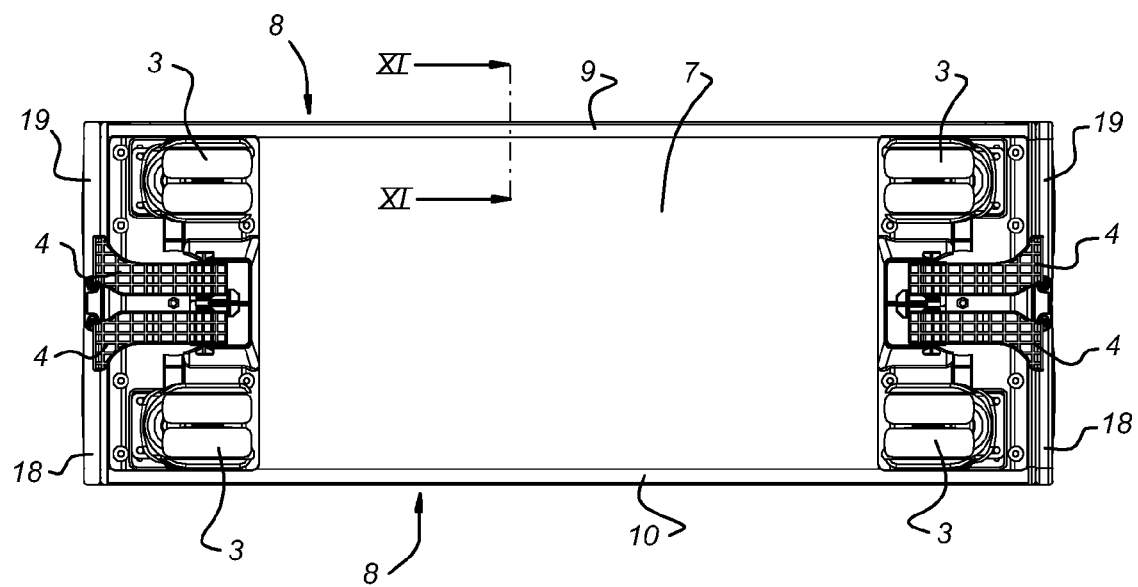
Figure 7:
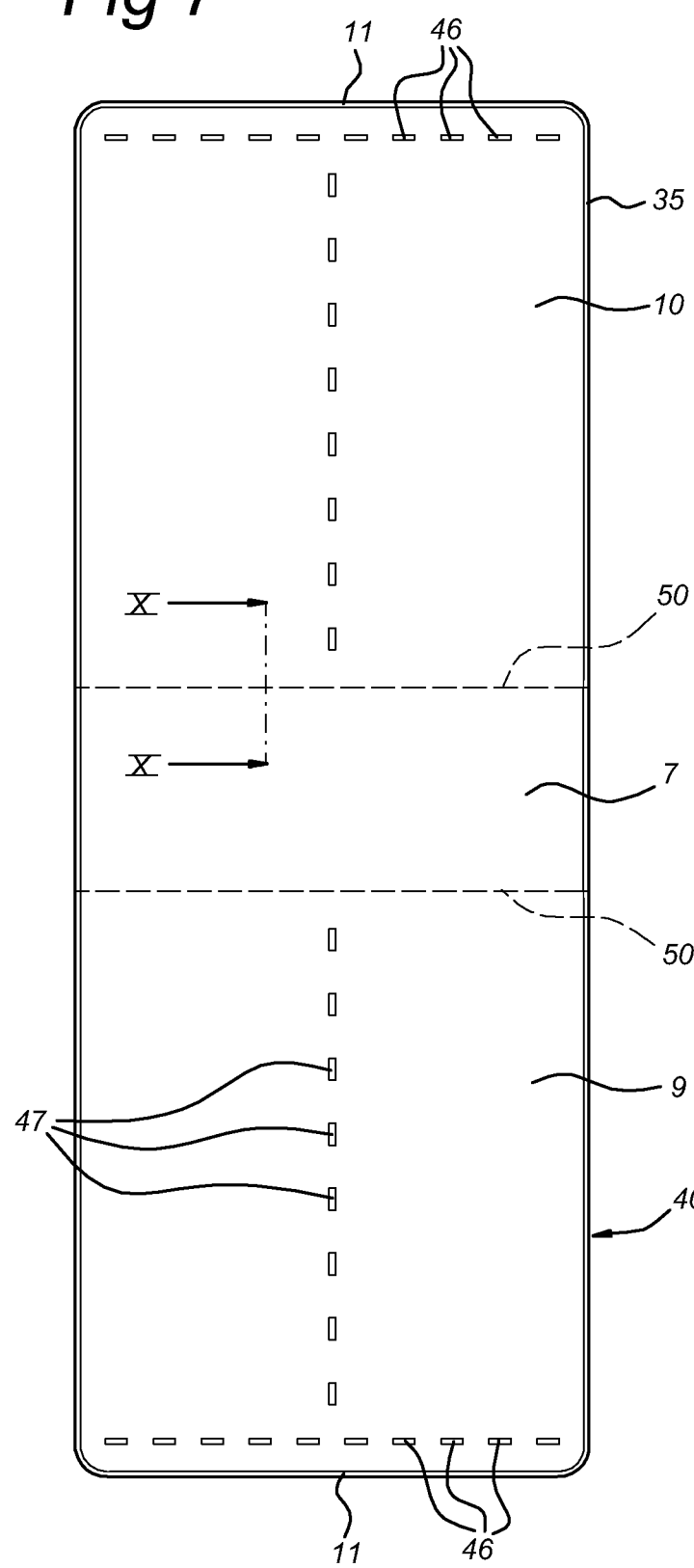
Figure 8:
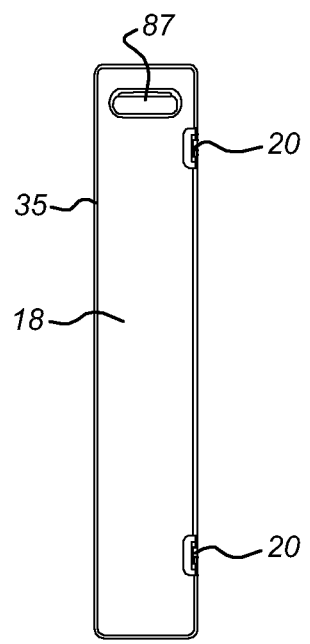
Figure 9:
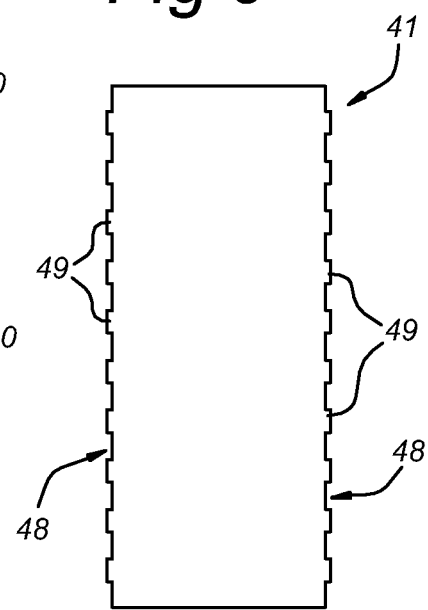
Figure 10:
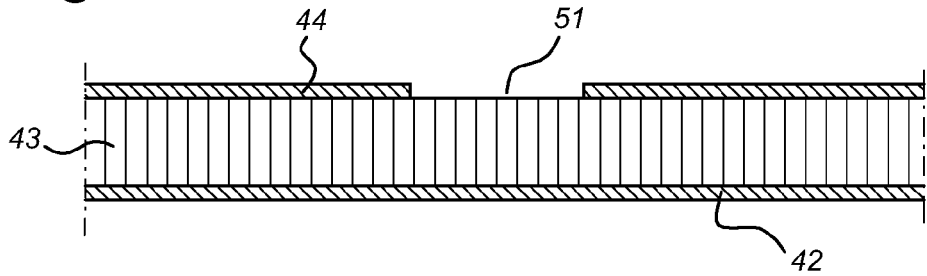
Figure 11:
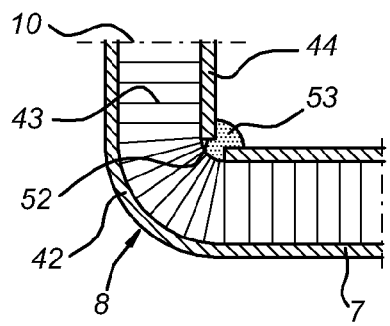
Figure 12:
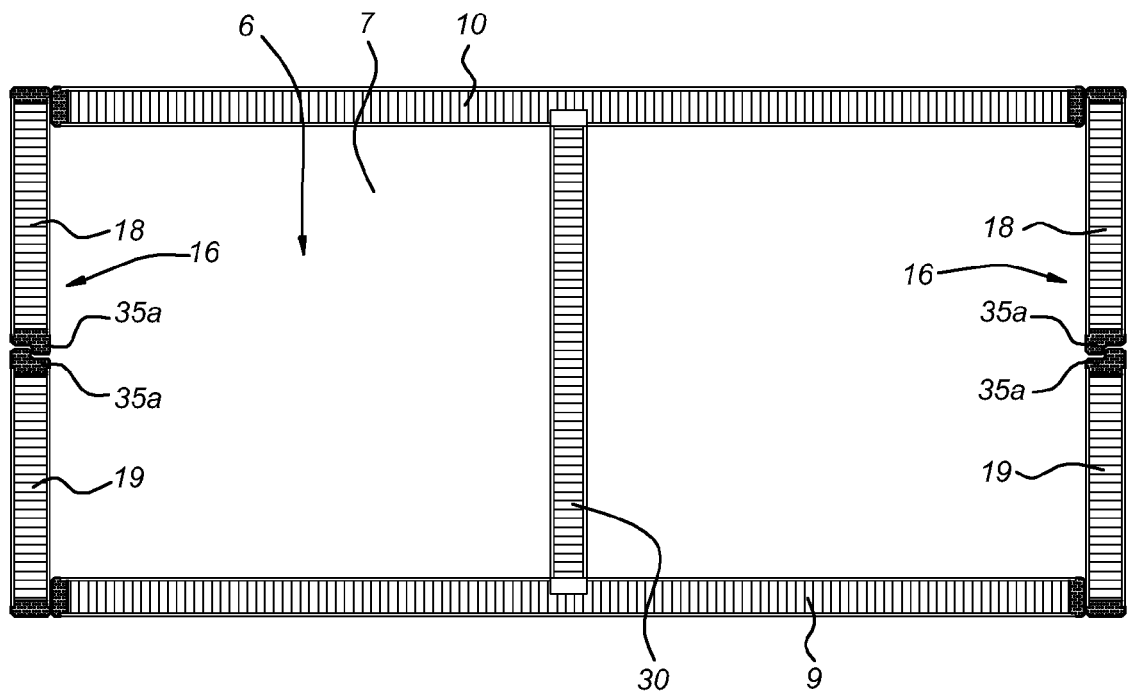
Figure 13A:
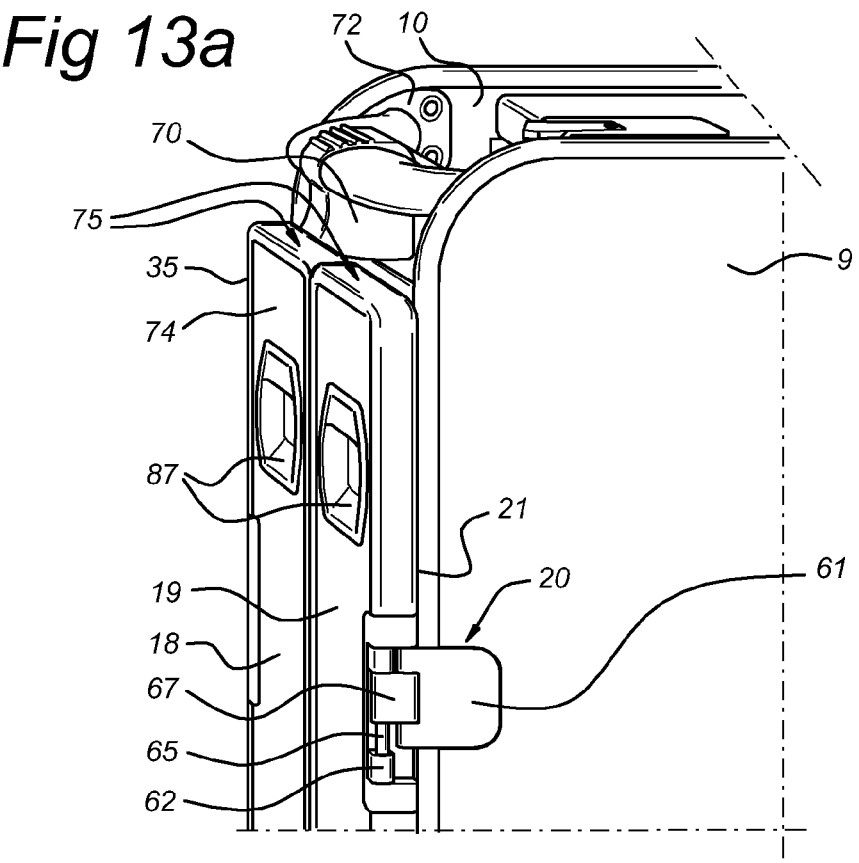
Figure 13B:
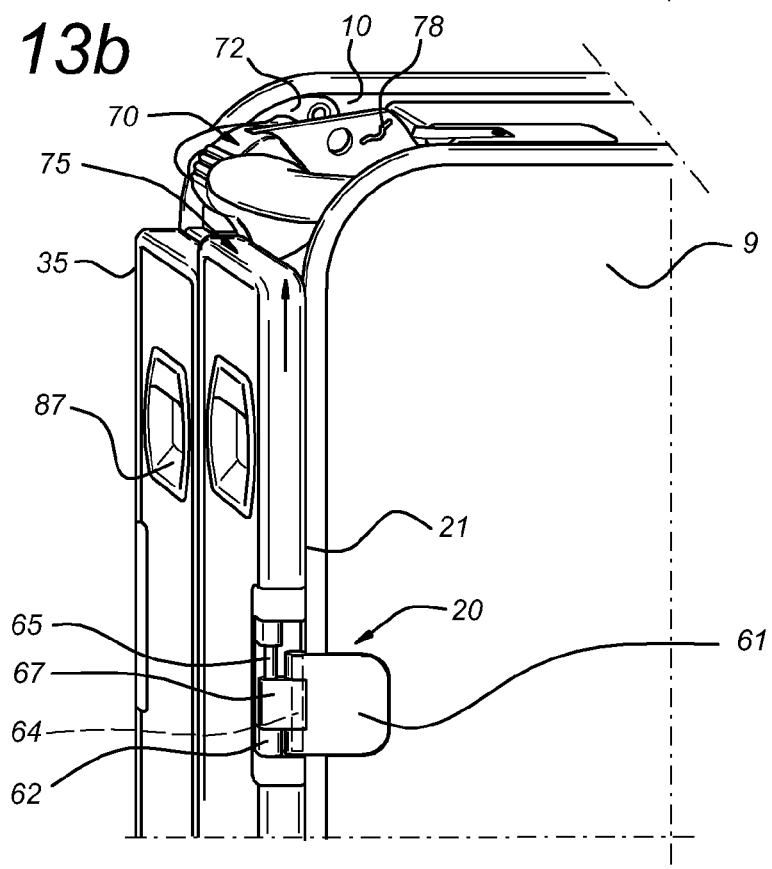
Figure 13C:
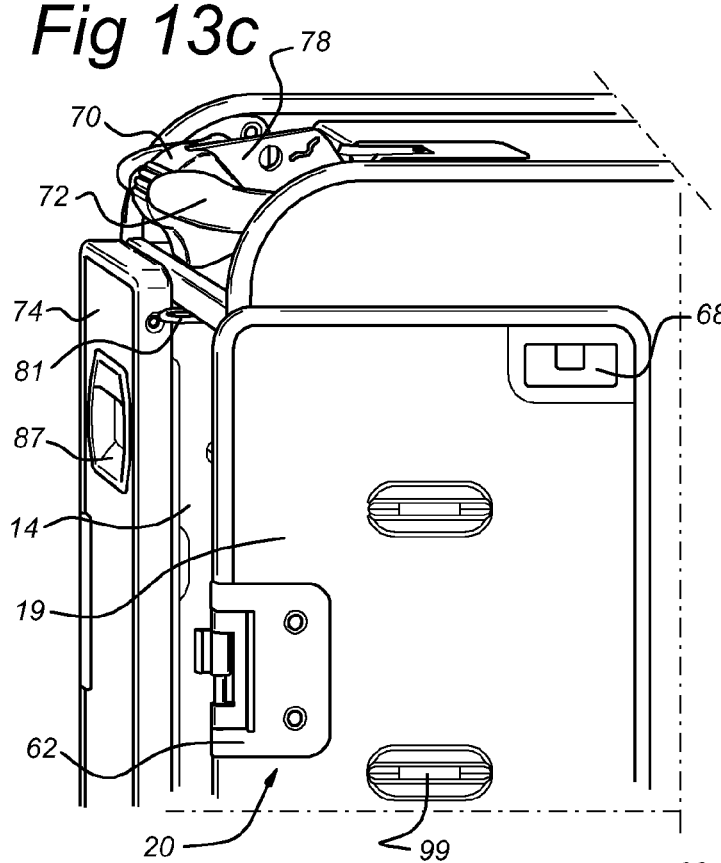
Figure 16:
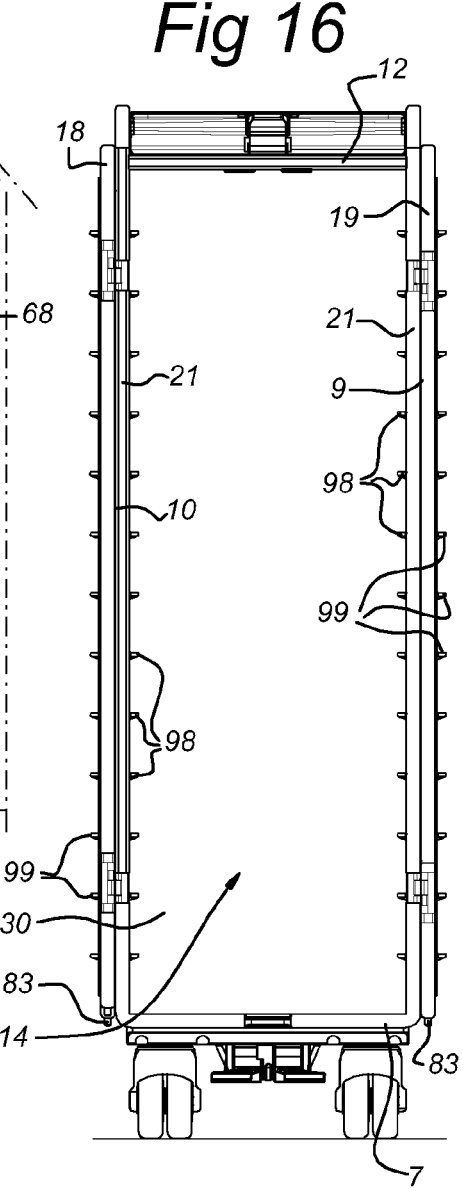
Figure 14:
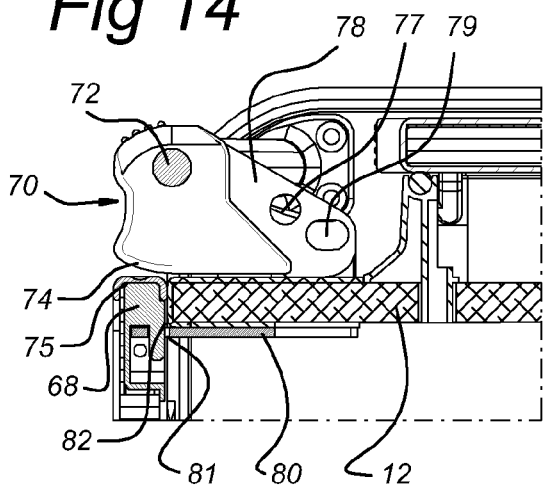
Figure 15:
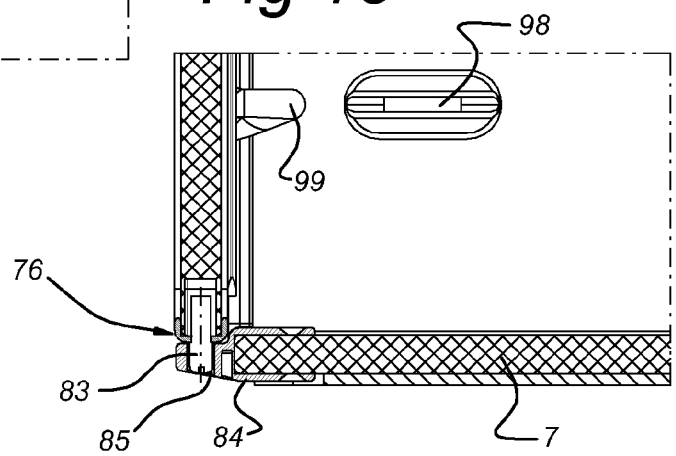
Figure 17:
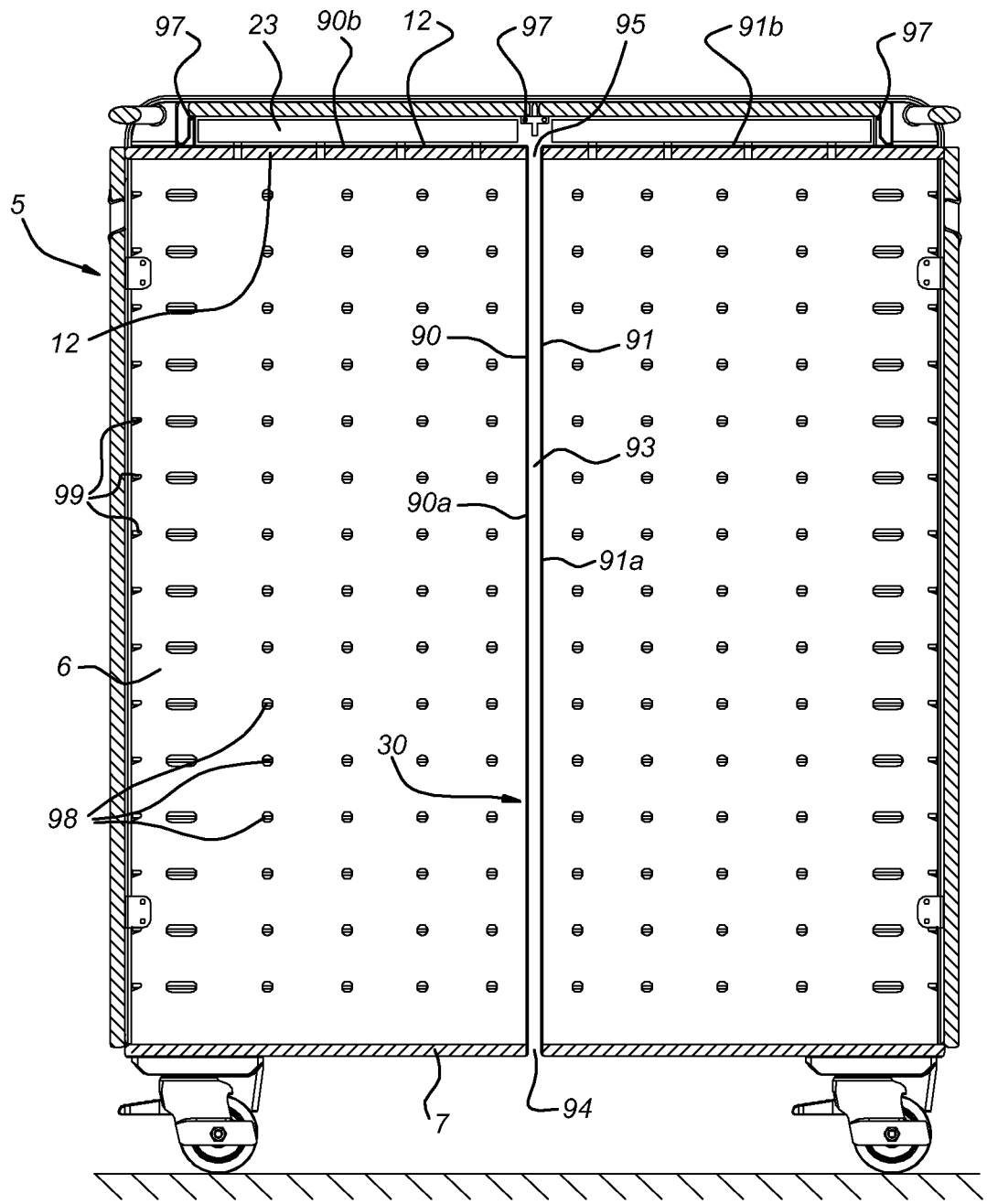
Figure 18:
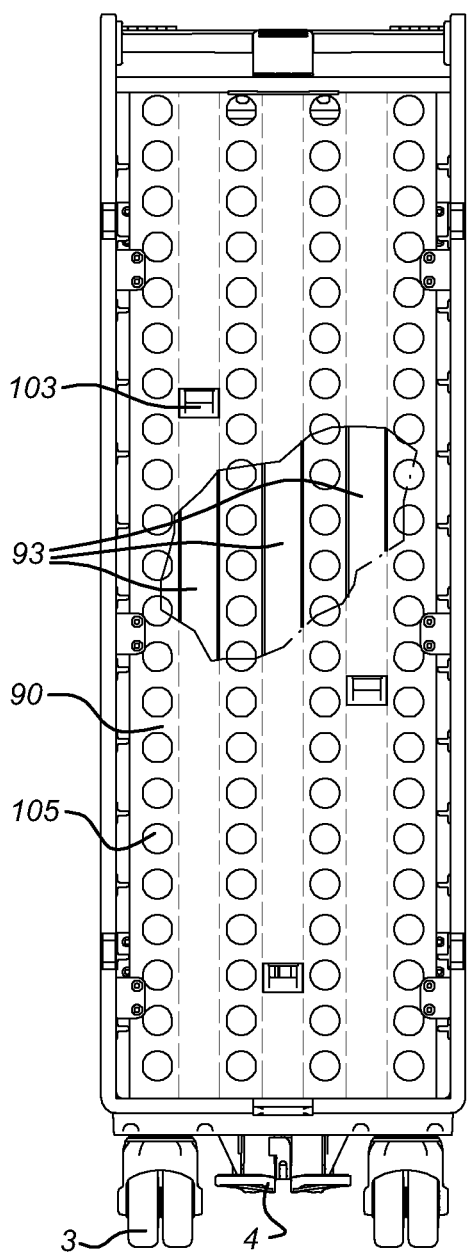
Figure 19:
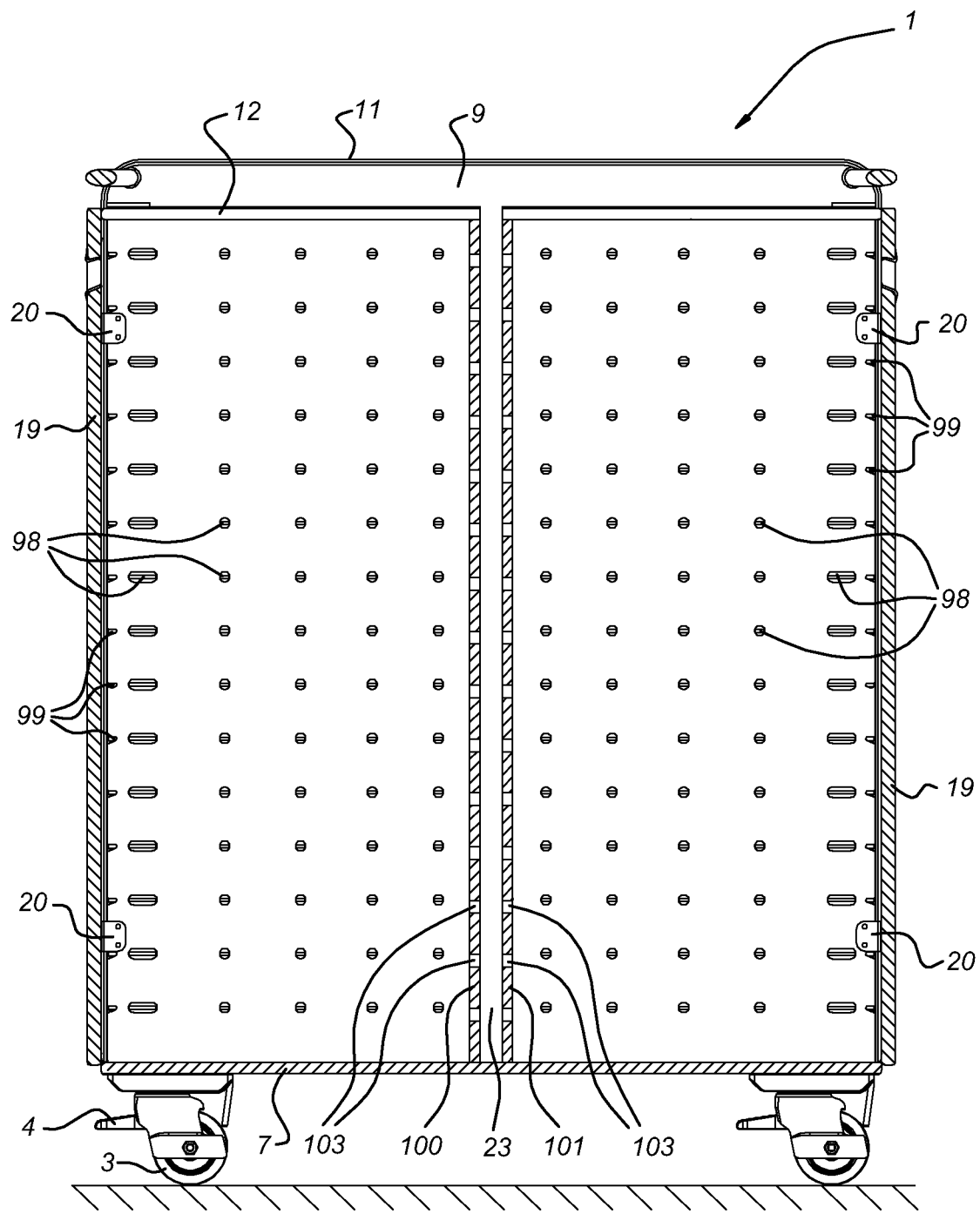

The invention will now be explained in more detail with reference to the accompanying drawing, in which:

FIG. 1 shows a perspective view of a first embodiment of a trolley according to the invention;
FIG. 2 shows a front view of the trolley shown in FIG. 1;
FIG. 3 shows a side view of the trolley shown in FIG. 1;
FIG. 4 shows a sectional view along IV-IV in FIG. 2;
FIG. 5 shows a top view of the trolley shown in FIG. 1;
FIG. 6 shows a bottom view of the trolley shown in FIG. 1;
FIG. 7 shows a blank for forming the bottom wall and the side walls of the trolley shown in FIG. 1;
FIG. 8 shows a blank for forming a door panel of the trolley shown in FIG. 1;
FIG. 9 shows a blank for forming a partition and for forming a top wall of the trolley shown in FIG. 1;
FIG. 10 shows a sectional view along X-X in FIG. 7;
FIG. 11 shows a sectional view along XI-XI in FIG. 6;
FIG. 12 shows a sectional view along XII-XII in FIG. 3;
FIGS. 13a, 13b, 13c show the action of the door lock;
FIG. 14 shows a sectional view along XIV-XIV in FIG. 2;
FIG. 15 shows a sectional view along XV-XV in FIG. 2;
FIG. 16 shows a front view of the trolley shown in FIG. 1 with the door panels completely open;
FIG. 17 shows a sectional view of a second embodiment of a trolley according to the invention;
FIG. 18 shows a sectional view of a third embodiment of a trolley according to the invention;
FIG. 19 shows a sectional view of a fourth embodiment of a trolley according to the invention.

The trolley shown in the drawing has several new aspects, which each form a separate invention. Each of these aspects is of independent importance, i.e. each of these aspects can be applied separately in the known trolley. In addition, the trolley according to the invention may comprise all possible combinations of one or more of these aspects. In this description of the figures, several aspects are described.

The trolley according to the invention is denoted in its entirety by reference numeral 1. The trolley 1 according to the invention is a service trolley. The service trolley 1 is suitable for being wheeled up and down an aisle of, for example, an airplane. The trolley 1 is also suitable for other uses, such as in trains, vessels or hospitals. The service trolley 1 is usually of narrow design, i.e. the ratio of the height to the width of the service trolley is relatively large. This ratio is, for example, between 2 and 6, such as approximately 4.

The trolley 1 comprises four casters 3. By means of the casters 3, the trolley 1 can be moved and maneuvered in a simple manner. Each caster 3 is connected to a pedal 4 which can be used to lock the casters 3. The casters and the locking thereof by means of the pedal 4 are known per se and are therefore not described in any more detail here. A housing 5 rests on the casters 3.

The housing 5 comprises a bottom wall 7, which is substantially rectangular. The housing 5 also has two upright side walls 9, 10, each of which extends along a long side of the bottom wall 7 up to a top edge 11. Each bottom edge of the side walls 9, 10 is connected to in each case one long outer edge of the bottom wall 7. The housing 5 furthermore comprises a top wall 12, which is fitted between the upright side walls 9, 10. The top wall 12 is recessed relative to the top edges 11 of the side walls 9, 10.

The long sides of the rectangular bottom wall 7 and the side walls 9, 10 determine the longitudinal direction A of the trolley 1. The transverse direction B runs at right angles to the longitudinal direction A, i.e. parallel to the narrow sides of the bottom wall 7. During use of the trolley 1, the side walls 9, 10 are aligned with the aisle. Incidentally, the figures show a so-called full-size trolley. The trolley according to the invention may however also be a so-called half-size trolley, the dimensions of the trolley in the longitudinal direction A being roughly halved.

As a result of the rectangular bottom wall 7, a service trolley usually has the shape of an elongate block, in which empty space is reduced to a minimum. The longitudinal sides of the housing are longer than the transverse sides of the housing. After all, the longitudinal sides of the housing form the long sides of the trolley, while the transverse sides of the housing form the narrow sides of the trolley. This is advantageous in respect of the stability of the trolley, as the flight attendant will push the trolley on the narrow transverse side through the aisle.

One aspect of the trolley 1 shown in FIG. 1 is the split door 16, i.e. the door 16 comprises two door panels 18, 19. The housing 5 has an access opening 14 at the front of the trolley 1, which is delimited by the end edge of the bottom wall 7, the upright edges 21 of the side walls 9, 10 and the end edge of the top wall 12. The access opening 14 is situated on a transverse side of the housing 5. The access opening 14 can be closed off by means of the door panels 18, 19 of the split door 16.

On the rear of the full-size trolley 1 shown in FIG. 1, an access opening 14 is provided as well. The access opening 14 on the rear can be closed off in the same manner as the access opening 14 at the front by a split door 16 having two door panels 18, 19. The trolley 1 is symmetrical relative to the transverse central plane through the side walls 9, 10. In a half-size trolley (not shown) the rear is closed off by a closed rear wall. The aspects of the invention described here can also be applied to a half-size trolley (not shown) of this type.

The door panels 18, 19 are each pivotable between a closed position, in which the door panels 18, 19 close off the access openings 14 (see FIGS. 1 and 2). By pivoting the door panels 18, 19 outward, the door panels 18, 19 reach an open position, in which the interior 6 of the housing 5 is accessible via the access opening 14.

In order to pivot the door panels 18, 19, each door panel 18, 19 of the trolley 1 shown in FIG. 1 is connected to in each case one upright edge 21 of the side walls 9, 10 via two hinges 20. In addition, each door panel 18, 19 can be locked relative to the housing 5 in the closed position.

Due to the certification rules for an airplane trolley, the door panels 18, 19 have to remain closed if the contents of the housing 5 exert a force of 9 g on the door panels 18, 19—g being the gravitational acceleration of approximately 9.8 m/s². The forces exerted on the door panels 18, 19 are of a magnitude of approximately 800 kg or more. These forces have to be dissipated to the housing 5.

The known airplane trolley has a single door instead of two door panels. This single door usually hangs on one of the side walls by two or three hinges, while the door comprises two latches for locking, which latches can engage on the opposite side wall and the bottom wall of the housing, respectively. The forces exerted on the door by the contents are thus introduced into only four or five places in the housing.

According to one aspect of the invention, the door 16 is a split door comprising two door panels 18, 19. Each door panel 18, 19 is hung by two hinges 20 on in each case one side wall 9, 10. Furthermore, each door panel 18, 19 can be locked by two engagement means which engage on the top wall 12 and the bottom wall 7 of the housing 5, respectively. With this trolley 1, the forces exerted by the contents of the trolley are introduced into eight locations in the housing 5. If each door panel 18, 19 is hung by three hinges (not shown), as many as ten locations are available.

The split door 16 and its lock may, as a result, be of relatively lightweight design. Although the trolley 1 has more hinges than the known trolley, the total weight of the trolley 1 is reduced by the lightweight design of the hinges, the door panels and the lock.

In one embodiment (not shown), each door panel 18, 19 can be secured in line with the side wall 9, 10. The door panels 18, 19 then extend at right angles relative to the access opening 14. As shown in FIG. 16, the inside of the door panels 18, 19 is provided with series of pins 99 which are arranged at different heights. Each series of pins 99 corresponds to a series of pins 98 which are attached on the inside of the housing 5 on the side walls 9, 10 (see also FIG. 4). Serving trays (not shown) can be supported by each series of pins 98, 99.

If the door panels 18, 19 secured in the prolongation of the side walls 9, 10 protrude, serving trays can be supported on the series of pins 99 between the door panels 18, 19. When meals are being served in the airplane cabin, a serving tray can be slid from the interior 6 of the housing 5 over the pins 98, 99 between the extended door panels 18, 19. This makes it easier to serve the airline passengers.

Instead of a pin guide, the guide of the serving trays may be designed as ridges on the inside of the housing and/or the inside of the door panels. This is particularly advantageous if the inside of the walls of the housing or the door panels is made of aluminum. The ridges can then be integrally formed.

The split door is of independent importance, in particular because of the weight reduction and the improvement in the ease of operation. The split door can also be used, for example, in an otherwise known airplane trolley, thus also achieving the abovementioned advantages. The aspect of the split door can thus be the subject matter of a separate patent application.

A further aspect of the invention is the upright partition 30 which, as illustrated in FIG. 4, is fitted transversely between the side walls 9, 10. The partition 30 runs in the transverse direction B of the trolley 1. The partition 30 divides the interior 6 of the housing 5 into two sub-chambers 32, 33. As the partition 30 is in the center of the side walls 9, 10, these sub-chambers 32, 33 are of substantially identical volume. The partition 30 is preferably connected along all its outer edges to the bottom wall 7, the side walls 9, 10 and the top wall 12, respectively (see also FIG. 16).

In use, the contents of the trolley 1 are distributed over the sub-chambers 32, 33. One half of the contents is accommodated in the sub-chamber 32 shown on the left in FIG. 4, while the other half of the contents is situated in the sub-chamber 33 shown on the right in FIG. 4. If, during the certification test, the trolley 1 is subjected to an acceleration of 9, g toward the right-hand side in FIG. 4, the contents of the sub-chamber 32 only exert forces on the door panels 18, 19 on the front of the trolley 1, while the partition 30 absorbs the forces which are exerted by the contents of the sub-chamber 33. These forces on the partition 30 are diverted to the housing 5 via the connection with the housing 5.

This means that only half the contents of the trolley 1 acts on the door panels 18, 19 and the other half is dissipated via the partition 30. The strength and rigidity of an airplane trolley is defined in the certification tests. In view of the importance of weight reduction, in particular in the airplane industry, the trolley of the given strength and rigidity is designed to be as lightweight as possible.

The requirements regarding strength and rigidity of the door panels 18, 19 of the trolley 1, which requirements are a result of, for example, the 9 g certification test, are less stringent than with the door of the known trolley, due to the distribution of the load over the door panels 18, 19 and the partition 30. Although, compared to the known trolley, the partition 30 forms an additional component, the total weight of the trolley 1 including the lightweight partition 30 is less than that of the known trolley.

Incidentally, the partition 30 may also take up only part of the cross section of the interior 6 (not shown). In that case, it is possible to slide a number of serving trays from sub-chamber 32 to sub-chamber 33 and vice versa.

In one embodiment (not shown), the partition is arranged in the interior of the housing 5 so as to be pivotable. The pivotable partition can in this case be locked in the perpendicular position, transversely between the side walls 9, 10. During the certification test, the partition absorbs half the load, while during use of the trolley 1 in an airline cabin, the serving trays can be slid from one sub-chamber 32 to the other sub-chamber 33 and vice versa.

In particular because of the weight reduction, the partition is of independent importance. The partition can, for example, also be used with an otherwise known airplane trolley, thus also making a reduction in the total weight of the trolley possible. In addition, the aspect of the partition is independent of the aspect of the split door or further aspects. It is, for example, possible for the trolley shown in FIG. 1-16 to be designed as having a single door. The aspect of the partition can therefore be the subject of a separate patent application.

A further aspect of the trolley shown in FIG. 1 is the construction from panels having a plastic rim. The design thereof will now be explained in more detail, in particular with reference to FIGS. 7-12. The bottom wall 7 and the side walls 9, 10 of the housing 5 are formed by a U-shaped panel. FIG. 7 shows the flat blank 40 of the U-shaped panel.

As illustrated in FIGS. 10 and 11, the U-shaped panel 40 has a honeycomb structure 43. The panel 40 with the honeycomb structure has an outer layer 42 which is intended to form the outside of the trolley 1, and an inner layer 44 which is intended to form the inside of the trolley 1. With the trolley 1, the outer layer 42 is thus turned outward and the inner layer 44 is turned toward the interior 6 of the housing 5.

The outer layer 42 comprises, for example, three layers of resin-impregnated glass fibers. The glass fibers of the layers are arranged so that they cross one another, i.e. the glass fibers of different layers extend in different directions, for example transverse to one another. The inner layer 44 comprises, for example, only one layer of resin-impregnated glass fibers. The inner layer 44 does not have to be as strong as the outer layer 42.

The honeycomb structure 43 is arranged between the outer layer 42 and the inner layer 44, which honeycomb structure 43 is for example formed by resin-impregnated paper. The honeycomb structure 43 imparts considerable rigidity to the panel, while the panel remains relatively lightweight.

Incidentally, the construction from panels having a honeycomb structure is not obligatory for the invention. One or more panels of the trolley according to the invention may comprise a sandwich construction of any combination of (aluminum) honeycomb structure, foam, resin-impregnated (glass) fibers, plastics and aluminum. It is even possible to use other kinds of material. The panel has for example an outer layer and an inner layer of aluminum, while the intermediate core comprises aluminum honeycomb structure or foam. It is also possible for the outer layer to be made from aluminum, the core from foam and the inner layer from resin-impregnated fibers.

The blank 40 has two weakened lines 50, which are formed by a cutout 51 in the inner layer 44 of the panel 40 (see FIGS. 7 and 10). The cutout 51 is formed by a cut-away section of the inner layer 44. The section of the blank 40 which corresponds to the bottom wall 7 of the trolley 1 is situated between the weakened lines 50. On either side of the bottom wall 7, the respective side walls 9, 10 are connected via the weakened lines 50. The weakened lines 50 form folding lines.

When the side walls 9, 10 are folded over the weakened lines 50 relative to the bottom wall 7, the sections of the inner layer 44 on both sides of the cutout 51 are moved toward one another (see FIG. 11). Nevertheless, there is still a gap 52 between them. The interior 6 of the housing 5 has to be watertight. In order to seal the gap 52, a sealant 53 is poured into the gap 52 after the side walls are folded over.

The viscosity of the sealant 53 is such that it flows through the core 43 up to the outer layer 42. In this manner, the sealant 53 also forms a reinforcement of the bottom edge 8 of the trolley 1. With the known trolley, these bottom edges have rims forming shock-absorbing edges. As a result of the reinforcement by the sealant 53, it is not necessary to provide the bottom edges 8 of the trolley 1 with rims. Omitting these rims in turn results in a reduction in weight.

The door panels 18, 19, the top wall 12 and the partition 30 are also made from such panels. These panels may be of the same construction as the U-shaped panel illustrated in FIG. 10. The panels for the door panels 18, 19, the top wall 12 and the partition 30 also comprise an inner layer 44, an outer layer 42 and a core 43 between the inner layer 44 and the outer layer 42. Again, any combination of (aluminum) honeycomb structure, foam, resin-impregnated (glass) fibers, plastic and aluminum or even other materials is possible for the inner layer 44, the outer layer 42 and the core 43. The blank for forming a door panel is shown in FIG. 8; the blank for forming the top wall and the partition is shown in FIG. 9.

As shown in FIG. 7, the flat blank 40 for forming the U-shaped panel of the housing 5 is in each case provided with a series of spaces 46 along the edges corresponding to the top edges 11 of the side walls 9, 10. The series of spaces 46 are arranged substantially parallel and at a distance from the top edges 11. A further series of spaces 47 runs transversely relative to the series of spaces 46.

FIG. 9 shows a rectangular blank 41 for forming the top wall 12 and the partition 30. The top wall 12 and the partition 30 can therefore be produced from the same blank 41. The blank 41 has lips 49 corresponding to the spaces 46, 47 along its longitudinal edges 48.

Once the trolley 1 has been assembled by bending the blank 40 shown in FIG. 7 along the weakened lines 50 to form a U-shaped panel, the lips 49 on both upright edges 48 of the partition 30 fall into the spaces 47 of the U-shaped panel. In this case, the partition 30 rests on the bottom wall 7. The top wall 12 of the trolley 1 is substantially straight above the bottom wall 7, the series of spaces 46 receiving the lips 49 of the top wall 12. If desired, the connections between the spaces 46, 47 and the lips 49 are reinforced with glue.

For the purpose of the function of the partition 30, it should be noted that the partition 30 also has lips 49 on the bottom edge and the top edge in a non-illustrated embodiment. Corresponding spaces are then made in the bottom wall 7 and the top wall 12 of the trolley 1 according to the invention in which spaces the lips of the bottom edge and top edge, respectively, can be received, if desired with the use of glue. In this case, the partition 30 is more firmly connected to the housing 5. The partition 30 can dissipate forces to the housing 5 along all of its outer edges.

The blank 40 has series of holes (not shown) which can receive corresponding guide pins 98 (see FIG. 18). Each series of guide pins 98 provides a guide for supporting one or more serving trays. The series of holes run substantially parallel to the series of spaces 46. The series are arranged a distance apart, i.e. at different heights from the bottom wall 7. Optionally, the connections of the guide pins 98 in the holes are reinforced with glue.

If the inner layer 44 of the blank 40 is made from aluminum, the guides may also be integrally formed as ridges. Instead of the pin guide, the ridges then form a continuous guide which can support the serving trays well.

Along the corner edges of the housing, the known trolley has rims of aluminum or stainless steel which form shock-resistant corner edges of the trolley. The aluminum or steel rims are relatively heavy—the rims constitute a significant part of the total weight of the trolley. According to one aspect of the invention, however, the trolley 1 has plastic rims 35, for example rims 35 made from polyurethane. The mass of the plastic rims 35 is smaller than the mass of the known rims of aluminum or steel. As a result, the weight of the trolley 1 according to the invention is significantly reduced.

In addition, the plastic rims 35 are slightly flexible. When the trolley 1 bumps into an object, the plastic rims can deform. Consequently, there is less chance of damage to the trolley or the object occurring.

In order to form the plastic rims 35, the blank 40, i.e. the U-shaped panel in a flat state, is placed in a mold, following which a plastic, such as polyurethane, is injected. As a result, the rim 35 is produced seamlessly surrounding the entire periphery of the panel 40. In this case, the rims 35 are integrally molded on. These rims 35 are each substantially arranged on the end surfaces of the outer edges of the panel 40.

A rim 35 is not only provided on the outer edges of the blank for the U-shaped panel, but such a rim 35 is also arranged on the outer edges of the door panels 18, 19. To this end, the blank for the door panel 18, 19 is placed in a mold in a similar manner, following which the plastic is molded on.

As illustrated in FIG. 12, the rims of the door panels 18, 19 may be provided with stepped rims 35a, which engage with one another on the edges of the door panels 18, 19 facing one another. The result of the stepped rims 35a, is that the split door 16 seals the access opening 14 without leaving gaps.

In particular because of the weight reduction, but also because of the abovementioned further advantages, the construction of the trolley 1 from panels having plastic shock-absorbing edges is of independent importance. A trolley with a housing comprising panels with plastic shock-absorbing edges may for example also be used with an otherwise known trolley, thus likewise making it possible to reduce the total weight of the trolley. Also, this aspect is independent of the aspect of the split door or the partition—a trolley which is constructed from panels with plastic rims, but without a split door and/or without a partition is thus likewise possible. The aspect of the panels with (molded on) plastic rims is claimed in the present patent application.

The simplified production of such a trolley is connected thereto. In the production of the trolley with plastic rims of this type, the use of a U-shaped panel for forming the bottom wall and the side walls results in cost savings. A method for producing a trolley having a U-shaped panel in order to form the bottom wall and the side walls is also of independent importance.

A further aspect of the trolley 1 according to the invention is the lock of the door panels 18, 19. This lock for the door panels 18, 19 of the trolley 1 will now be explained in more detail, in particular with reference to FIGS. 13a-c, FIG. 14 and FIG. 15. In these figures, only the locking and unlocking of the door panel 19 on the front of the trolley 1 is shown. The locking of the further door panels 18, 19 on the front and rear is of similar design.

As has been described above, the door panel 19 is connected by hinges 20 to the upright edge 21 of the side walls 9. The hinges 20 of the door panel 19 determine at least one pivot axis for the door panel 19. If the trolley 1 rests on a floor with the casters 3, this pivot axis runs vertically relative to this floor. The door panel 19 can be pivoted about its pivot axis between an open position and a closed position. In the open position, the access opening 14 is partially cleared by the door panel 19, i.e. the interior 6 of the housing 5 is accessible via the access opening 14. In the closed position of the door panel 19, the access opening 14 is partially closed off by the door panel 19.

The door panel 19 is displaceable in a direction which runs substantially parallel to the pivot axis. The displaceability of the door panel 19 is achieved by means of a degree of clearance in the hinges 20. Each hinge 20 comprises two hinge parts 61, 62. The first hinge part 61 is attached to the side wall 9 of the housing 5, while the second hinge part 62 is connected to the door panel 19. Each of the hinge parts 61, 62 comprises one hinge pin 64 and 65, respectively. The hinge pin 65 of the hinge part 62 attached to the door panel 19 is longer than the hinge pin 65 of the hinge part 61 attached to the housing 5. The hinge pins 64, 65 are delimited on both their ends by stop surfaces of the respective hinge parts 61, 62.

The hinge 20 furthermore comprises a flat sleeve 67 which surrounds both hinge pins 64, 65. The sleeve 67 is rotatably retained between the stop surfaces of the hinge part 61 attached to the housing 5. The hinge pin 65 of the hinge part 62 attached to the door panel 19 is longer than the sleeve 67. The hinge pin 65 can be displaced within the sleeve 67. Therefore, the door panel 18, 19 can move up and down relative to the housing 5. This movement is limited by the stop surfaces of the hinge part 62 connected to the door panel 19.

In this manner, the hinges 20 have a clearance in the direction of the pivot axis, which during normal use substantially coincides with the vertical. Consequently, the door can be displaced in the vertical direction.

Moreover, the door panel 19 can be pivoted to such a degree by means of the hinges 20 that the door panel 19 comes to lie flat against the side wall 9 (see FIG. 16). This is possible because each of the hinge pins 64, 65 of each hinge 20 determines one pivot axis.

The door panels 18, 19 shown in FIG. 13a are in the closed position and in the locked state. The upper stop surface of the hinge part 62 attached to the door panel 19 then bears against the sleeve 67. In the closed position, the door panel 19 can be displaced between a locked position and an unlocked position. In the locked position, the door panel 19 is locked relative to the housing 5. From the locked position (closed position), the door panel 19 can be lifted slightly into the unlocked position, in which the door panel 19 can be pivoted about the pivot axis.

A handle 87 is situated on the outside of the door panel 19, near the top edge 75. The handle 87 facilitates the lifting of the door panel 19. The handle 87 is, for example, molded at the same time as the rims 35.

The lock of the door panel 19 comprises locking means which can engage with one another and are attached to the door panel 19 and the housing 5, respectively. The locking means comprise two pairs of engagement means. The first pair of engagement means is arranged on the top wall 12 and the top edge 75 of the door panel 19. The second pair of engagement means is arranged on the bottom wall 7 and the bottom edge 76 of the door panel 19.

The first pair of engagement means on the top edge 75 of the door panel 19 comprises a hook element 68 (see FIGS. 13c and 14). The hook element 68 is situated on the inside of the door panel 19, i.e. on the side facing the interior 6 of the housing 5. The hook element 68 is, for example, made from plastic. The hook element 68 can be molded on at the same time the rims 35 are molded.

On the inside of the top wall 12, a lock plate 80 having a ring 81 is mounted. The ring 81 protrudes relative to the end edge 82 of the top wall 12. In the closed position of the door panel 19, the hook element 68 of the door panel 19 can engage with the ring 81.

The second pair of engagement means on the bottom edge 76 of the door panel 19 has a pin-shaped projection 83, which projects downward relative to the bottom edge 76 (see FIG. 15). Furthermore, a lock plate 84 is attached on the end edge of the bottom wall 7, which lock plate 84 has a recess 85. In the closed position, the pin-shaped projection 83 extends into the recess 85.

In the locked position, the door panel 19 is locked by means of the hook element 68 and the pin-shaped projection 83 which engage with the ring 69 and the recess 85, respectively. In the closed position, the door panel 19 can be displaced upward from the locked position as a result of the clearance in the hinges 20. As a result of the door panel 19 being lifted, the hook element 68 of the door panel 19 moves out of the ring 81 and simultaneously the pin-shaped projection 83 moves out of the recess 85. In other words, when the door panel 19 is lifted up, the hook element 68 and its pin-shaped projection 83 are pulled out of the ring 81 and the recess 85, respectively. The lifted door panel 18 is then in the unlocked position. The door panel 19 can then swing into the open position, following which the door panel 19 can be displaced slightly downward until the sleeve 67 abuts against the top stop surface of the second hinge part 62.

The locking of the further door panels 18, 19 of the trolley 1 is of similar design. In the locked position, the force of gravity counteracts a displacement of the door panels 18, 19 from this position. In the case of external forces acting on the door panels, for example as a result of the trolley 1 being hit or as a result of turbulence, one or more door panels 18, 19 could inadvertently be released from the locked position. Therefore, a stop body 70 is provided.

The stop body 70 is pushed onto a push rod 72 which is arranged between the side walls 9, 10 above the top wall 12. The stop body 70 can be displaced between a securing position shown in FIGS. 13*a* and 14 and a releasing position shown in FIGS. 13*b* and 13*c*. In the securing position, the bottom surface 74 of the stop body 70 rests against the top edges 75 of the door panels 18, 19. In this position, the stop body 70 prevents an upward displacement of the door panels 18, 19.

In the releasing position (see FIGS. 13*b* and 13*c*), the bottom surface 74 of the stop body 70 is pivoted inward about the push rod 72. As a result, the door panels 18, 19 can be lifted out of the locked position and into the unlocked position.

The stop body 70 furthermore comprises a bracket 78 comprising two holes 77, 79. The hole 77 is intended for a padlock (not shown). The padlock extends through the hole 77 and through a fastening ring which is attached to the housing 5 (not shown). The hole 79 is intended for a customs seal. By attaching the seal on the top of the trolley 1, the seal can be attached in a simple manner and is clearly visible.

Although the trolley 1 shown in FIG. 1 comprises a split door with two door panels 18, 19, the lock according to this aspect of the invention is likewise possible for a door 16 which is formed by a single door panel. The single door panel is then hingedly connected by a side edge to an upright edge 21 of the one side wall 9 or 10, the opposite side edge of the door, in the closed position, extending up to the upright side edge of the other side wall 9 or 10. In the closed position of such a single door, the access opening 14 is fully closed off by the door.

The door lock according to the invention can be used with a trolley which can be moved along an aisle. The door lock according to the invention can likewise form part of an airplane galley. A galley comprises a number of storage cupboards and other spaces, each of which is closed off by a door. The door according to the invention which can be locked by lifting and lowering can also be used for these storage cupboards and spaces.

In particular because of the weight reduction and the increased ease of operation, the lock according to the invention is of independent importance. The lock according to the invention can, for example, also be used with an otherwise known airplane trolley, thus achieving the abovementioned advantages. Also, the abovementioned lock is independent of further aspects of the trolley—for example, the trolley comprising the lock according to the invention does not have a partition and/or panels with plastic shock-absorbing edges. The aspect of the lock can thus be the subject matter of a separate patent application.

As shown in FIGS. 2 and 4, there is a cooling compartment 23 at the top of the trolley 1, which cooling compartment 23 is delimited by the top outer surface of the top wall 12, the side walls 9, 10 and a cover 25 which is fitted between the top edges 11 of the side walls 9, 10. The cover 25 comprises two cover parts 26, 27 which are pivotably connected to one another. The cover parts 26, 27 may comprise panels having a structure corresponding to the structure described above for the side walls 9, 10 and the bottom wall 7 of the housing 5. The cover part 27 located at the rear of the trolley 1 is fixedly connected to the side walls 9, 10, whereas the cover part 26 at the front of the trolley 1 can pivot upward. It is then possible to fill the cooling compartment 23.

The cooling compartment 23 can accommodate a coolant, such as dry ice (solid carbon dioxide, $CO_2$). The cooling compartment 23 is in fluid communication with the interior 6 of the housing 5 via holes 29 in the top wall 12. During use at room temperature, the dry ice present in the compartment 23 will evaporate, following which the cooling vapor will be discharged into the interior 6 of the housing 5 via the holes 29. The contents of the housing 5, such as meals to be cooled, can thus be kept fresh longer.

In contrast to the known trolley, the trolley 1 shown in FIG. 1 does not comprise a separate cooling tray which is provided so as to be slidable between the top wall and a fixed cover wall. The cooling compartment 23 according to the invention thus achieves a saving on material, which reduces the costs and the weight of the trolley 1.

A further aspect of the invention relates to the improved cooling of the interior of the housing. As described above, it is usual to cool meals in a trolley in order to counteract deterioration and keep the meals fresh for longer. For this purpose, the known trolley has a cooling tray, which can accommodate dry ice. During use, the cooling tray is pushed into an accommodating space, which is located on the top wall of the trolley. The cooling tray filled with dry ice will cool the serving trays in the upper part of the trolley to a sufficient degree.

However, the cooling tray arranged on the top wall is less effective for cooling the lower serving trays. After all, the refrigeration emitted by the cooling tray has to sink down over the height of the trolley from the top wall to the bottom wall. Due to its narrow shape, this height is considerable with a service trolley which can be moved along an aisle. There are thus a considerable number of meals to be cooled between the top wall and the bottom wall, which warm up the refrigeration emitted downward. At the bottom of the service trolley, the refrigeration capacity has been reduced to such a degree that the meals are hardly cooled.

Thus, with the known trolley, considerable differences in temperature occur in the vertical direction. In practice, it is even the case that the meals immediately below the top wall are frozen, wile the meals near the bottom wall of the trolley are at a temperature which hardly differs from the temperature outside the trolley.

The trolley 1 in a second, third and fourth embodiment comprises an improved cooling system with which a lower temperature can be achieved in the lower part of the housing 5.

FIG. 17 shows the second embodiment of a trolley 1. Similar parts are denoted by identical reference numerals. The trolley 1 comprises a cooling compartment 23 on top of the top wall 12. The cooling compartment 23 is sealed well by means of sealing elements 97. A duct 93 runs from the cooling compartment 23 via a feed slot 95 in the top wall 12 to the interior 6 of the housing 5. The duct 93 comprises two panel-shaped duct walls 90, 91. Each of the duct walls 90, 91 is flanged along the feed slot 95 in the top wall 12. Thus, each duct wall 90, 91 comprises two panel parts 90a, 90b and 91a, 91b, respectively, which run substantially at right angles to one another.

The panel part 90a of panel 90 and the panel part 91a of panel 91 are arranged a distance apart and substantially parallel to one another in the interior 6 of the housing 5. Each of the panel parts 90a, 91a forms a partition wall of the partition 30. The duct 93 is situated between the panel parts 90a, 91a. Via the feed slot 95 in the top wall 12, the duct 93 is in fluid communication with the cooling compartment 23, in which dry ice is accommodated during use.

The panel part 90b of panel 90 and the panel part 91b of panel 91 bear against the top wall 12. Each of the panel parts 90b, 91b forms a bottom panel of the cooling compartment 23. When the cooling compartment 23 is filled with dry ice, the dry ice is situated on the bottom panels 90b, 91b of the cooling compartment 23, i.e. the dry ice contacts the panel parts 90b, 91b of the panels 90, 91.

The panel-shaped duct walls 90, 91 are made from aluminum, an aluminum alloy and/or another heat-conducting material. As a result, the refrigeration of the dry ice in the cooling compartment 23 is transferred to the interior 6 of the trolley 1 via heat conduction by the panel-shaped duct walls 90, 91. In addition, there is a slight superatmospheric pressure in the cooling compartment 23 as a result of the evaporation of the dry ice and the sealing of the ice compartment 23. The resulting cold vapor flows through the duct 93 between the panel-shaped duct walls 90, 91 to the bottom wall 7 of the trolley 1 by the effect of the superatmospheric pressure. The cold vapor effectively conveys the refrigeration through the duct 93 to a location at a distance from the top wall 12 by means of convection. By means of heat conduction by the duct walls 90, 91, the refrigeration then reaches the lowest region of the interior 6 of the housing 5. As a result, the meals which are situated at the bottom of the trolley are cooled to a sufficient degree.

Near the bottom wall 7, the cold vapor is slightly warmed up as a result of heat exchange with the duct walls 90, 91 and the interior 6 of the housing 5 and the vapor flows to the exterior via a discharge opening 94 in the bottom wall 7.

In the third embodiment illustrated in FIG. 18, similar components are denoted by identical reference numerals. This embodiment differs from that of FIG. 17 in that no discharge opening 94 is arranged in the bottom wall 7. In addition, three ducts 93 run between the panel parts 90a, 91a of the panels 90, 91, which ducts are separated from one another. Each duct 93 runs from the top wall 12 to the bottom wall 7, each duct 93 being in fluid communication with the cooling compartment 23 which is arranged on top of the top wall 12. In order to achieve a weight reduction, the panel parts 90a, 91a of the panels 90, 91 have weight-reducing holes 105. Each of the ducts 93 is situated between a vertical series of weight-reducing holes 105.

Each of the ducts 93 furthermore comprises an outlet opening 103. The outlet opening 103 of the center duct 93 is arranged near the bottom wall 7, whereas the outlet openings 103 of the other ducts 93 are arranged at a greater distance from the bottom wall 7. The cold vapor flows through the ducts 93 via the outlet openings 103 into the interior 6 of the housing 5. The cold vapor thus cools the contents of the interior 6 directly by means of convection. In practice, the embodiment shown in FIG. 18 provides excellent cooling throughout the entire interior of the trolley.

The discharge opening 94 and/or the outlet openings 103 affect the temperature distribution in the trolley. By the design of these openings and the ducts, it is possible to achieve a desired temperature at locations in the interior. In this case, each duct provides a passage for refrigeration past the contents in the upper part of the trolley, so that an excessive heat exchange with these contents does not take place and sufficient cooling of the bottom of the housing is possible.

In a non-illustrated embodiment, the panels 90, 91 may be arranged on the inside of the side walls 9, 10, with the duct being formed on one or both side walls 9, 10. The duct 93 may then be arranged between a side wall 9, 10 and an adjoining panel. In that case, no partition is present in the trolley 1, so that serving trays can be moved from the front to the rear and vice versa. It is also possible for such ducts on the side walls to be tubular. The tubular ducts on the side walls run transversely, for example, to the guide for the serving trays.

A fourth embodiment of the trolley 1 is illustrated in FIG. 19. Similar components are denoted by identical reference numerals. Cooling the embodiment of the trolley 1 shown in FIG. 19 is achieved by the cooling compartment 23 being integrated with the partition 30. The cooling compartment on the top wall 12 of the trolley is in this case superfluous. As a result, additional space is available on the top wall 12 of the trolley 1.

In the embodiment shown in FIG. 18, the cooling compartment 23 designed in the form of a partition 30 comprises two parallel partition walls 100, 101, which are arranged at a distance from one another. The distance between the partition walls is 30-250 mm, for example. The cooling compartment 23 is formed between the partition walls 100, 101. The partition walls 100, 101 have several outlet openings 103. The dry ice which is accommodated in the cooling compartment 23 between the walls 100, 101, evaporates in the cooling compartment 23. As a result of the superatmospheric pressure, the cold vapor leaves the cooling compartment 23 via the outlet openings 103. The cold vapor then ends up in the interior 6 of the housing 5, the cold vapor cooling the contents of the trolley 1.

The cooling compartment 23 between the partition walls 100, 101 ensures that the cooling is evenly distributed over the height of the trolley 1. Both the serving trays at the top as well as the serving trays at the bottom of the trolley 1 are within the desired temperature range, preferably between 4-6° C.

In accordance with the embodiment according to FIG. 17, it is likewise possible for the partition walls 100, 101 to be made from aluminum or an aluminum alloy, so that the refrigeration is dissipated to the interior of the housing 5 via conduction. In this case, the cooling compartment 23 has an opening, for example in the bottom wall 7, via which the cold vapor can leave the cooling compartment 23 by the effect of superatmospheric pressure.

The cooling system described with reference to FIGS. 17-19 is of independent importance. After all, this cooling system can also be used with a known airplane trolley, thus also achieving a lower temperature at the bottom of the trolley. The improved cooling system shown in FIGS. 17-19 can thus be the subject matter of a separate patent application.

The embodiments shown in the figures are only examples of the invention which do not limit the scope of the invention in any way.

The invention claimed is:

1. A device for accommodating objects, in particular for use in an airplane, the device formed as a trolley comprising:
   a housing provided with
   i) a bottom wall,
   ii) two upright side walls, each side wall extending from the bottom wall,
   iii) a top wall arranged substantially parallel to the bottom wall and transversely between the side walls, at least one wall of said walls is formed as a panel that is provided with a core, the core is covered on either side with an inner layer and an outer layer, respectively, wherein the panel has at least one outer edge which is provided with a plastic rim forming a shock absorbing edge, the rim integrally molded onto said outer edge of said panel, iv) at least one access opening in the housing, the at least one access opening being delimited by the walls, and v) at least one door which is connected to an upright side wall so as to be pivotable between an open position, in which the access opening is accessible, and a closed position, in which the access opening is at least partially closed off, and in which the door is provided with a core, which is covered on either side with an inner layer and an outer layer, respectively, and the door comprises two door panels in which each door panel is provided with a core, which is covered on either side with an inner layer and an outer layer, respectively, in which each door panel comprises a plastic rim on a peripheral edge of the door panel, and the door panels are provided with guides for supporting serving trays on the inside facing an interior of the housing, which guides each comprise a series of pins inserted in holes in the door panel.

2. The device as claimed in claim 1, wherein the plastic comprises polyurethane.

3. The device as claimed in claim 1, wherein the inner layer and the outer layer each comprise aluminum.

4. The device as claimed in claim 1, wherein the core of the panel is provided with a honeycomb structure.

5. The device as claimed in claim 1, wherein each of the side walls of the housing has upright edges and top edges, in which the plastic rim is fitted on said upright edges and top edges so as to form shock-absorbing edges.

6. The device as claimed in claim 1, wherein the plastic rim is attached on the end edges of the bottom wall so as to form shock-absorbing edges.

7. The device as claimed in claim 1, wherein at least one of the panels comprises at least one cutout in the inner layer, the at least one cutout forming weakened lines.

8. The device as claimed in claim 7, wherein each of the at least one cutout extends along bottom edges of the housing, and wherein the at least one cutout is filled with a plastic in order to reinforce bottom edges.

9. The device as claimed in claim 8, wherein the plastic further extends through the core, from the inner layer up to the outer layer of the panel.

10. The device as claimed in claim 1, wherein a series of spaces is arranged on the inside of each side wall, which series of spaces run parallel to and at a distance from a top edge of said side wall, and in which the top wall is provided on its longitudinal edges with a series of lips, in which the lips on the top wall are received in these spaces in the side walls.

11. The device as claimed in claim 1, wherein an upright partition is fitted transversely between the side walls, which partition is provided with lips at least along its longitudinal edges, in which an upright series of spaces is provided on the inside of each side wall, which series of spaces extends from the bottom wall to the top wall, in which the lips of the partition are received in said spaces in the side walls.

12. The device as claimed in claim 11, wherein the partition is provided with a core, which is covered on either side with an inner layer and an outer layer, respectively.

13. The device as claimed in claim 1, wherein each door panel is provided with a plastic handle, which is molded at a same time as the plastic rim.

14. The device as claimed in claim 1, wherein each inside of the side walls facing an interior of the housing is provided with guides for supporting serving trays, which guides are each provided with a series of pins inserted in holes in said side wall.

15. The device as claimed in claim 1, wherein the inner layer and/or outer layer of the core is provided with aluminum and/or glass fibers, which are impregnated with resin.

16. The device as claimed in claim 1, wherein the bottom wall and the side walls are integrally formed as a U-shaped panel, which is formed from a flat rectangular blank, which has two weakened lines along which the blank can be folded, in which the bottom wall is formed between the weakened lines, and in each case one side wall is formed on the sides of the weakened lines facing away from the bottom wall, and in which a peripheral edge of the flat blank is provided with a plastic rim.

\* \* \* \* \*